Oct. 18, 1949.  W. B. WESTCOTT, JR  2,484,919
LANDING GEAR
Filed Feb. 21, 1947  2 Sheets-Sheet 2
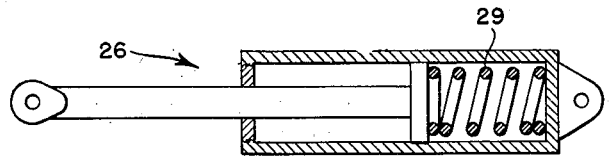
FIG. 7
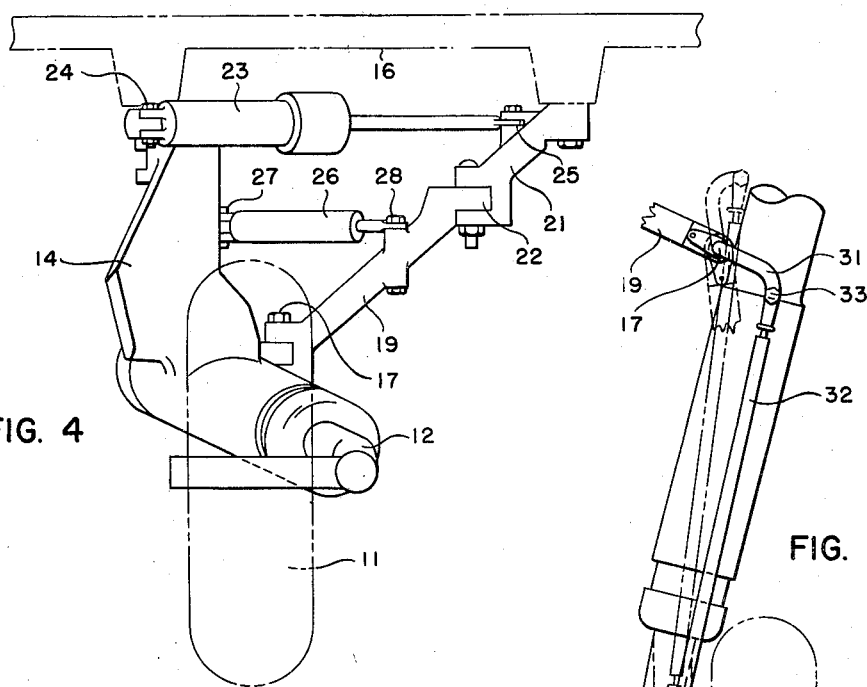
FIG. 4
FIG. 6
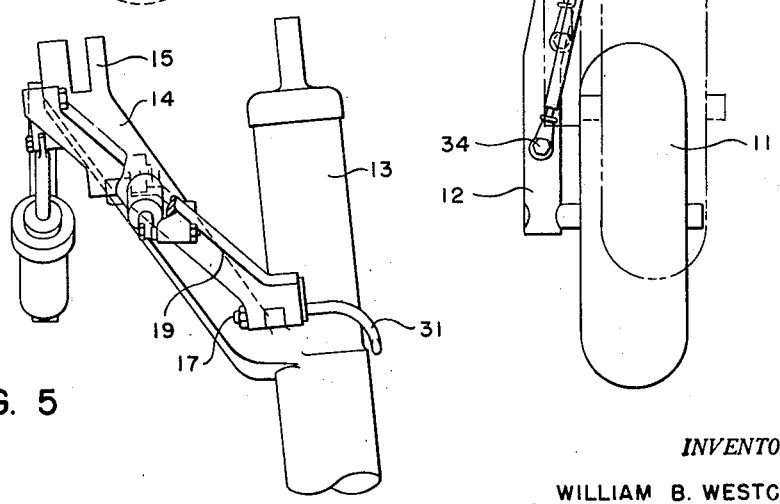
FIG. 5
INVENTOR.
WILLIAM B. WESTCOTT
BY
*Richard W. Treverton*
ATTORNEY Patented Oct. 18, 1949

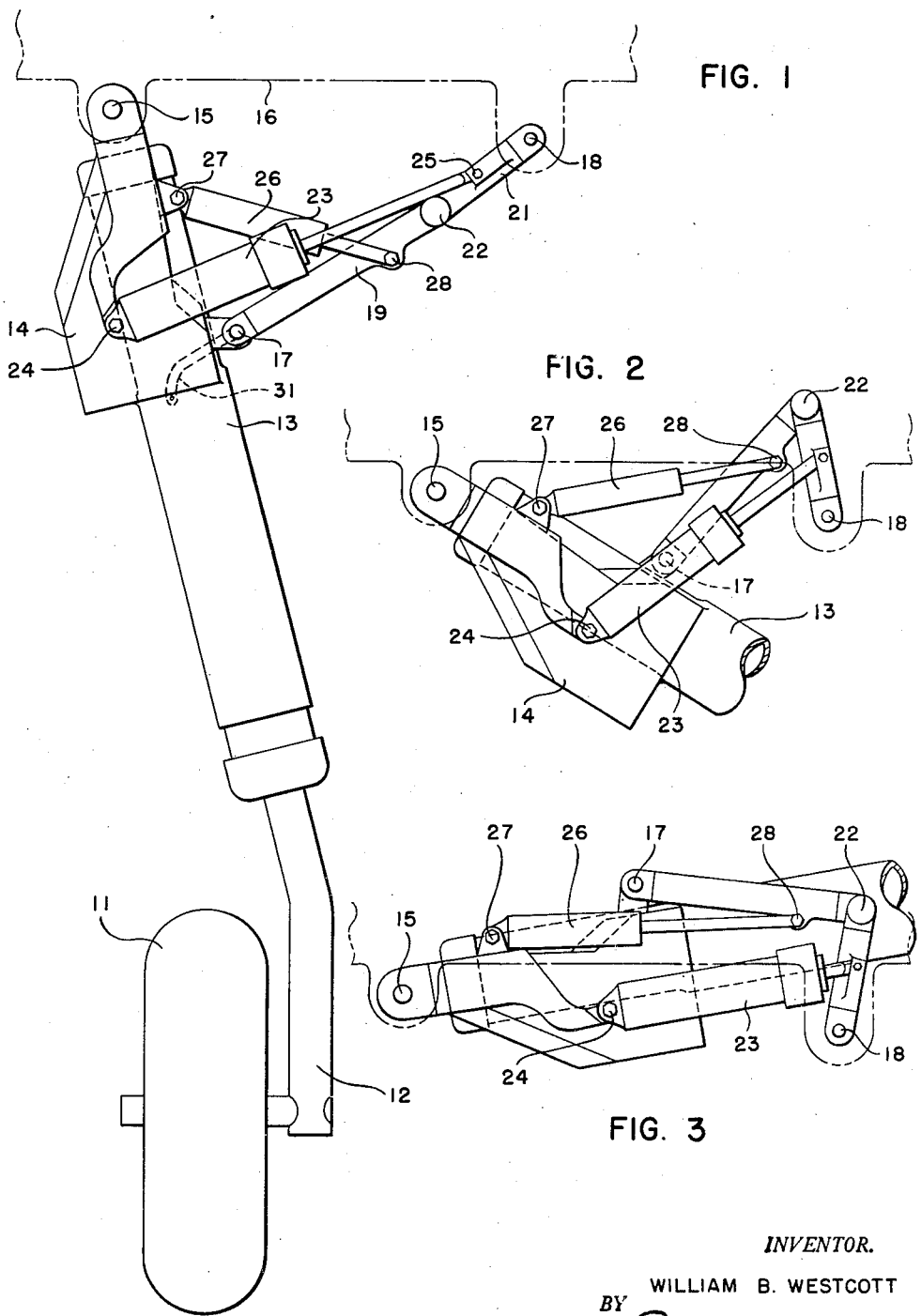

2,484,919

UNITED STATES PATENT OFFICE 2,484,919

LANDING GEAR

William B. Westcott, Jr., Kingston, N. Y., assignor to Curtiss-Wright Corporation, a corporation of Delaware Application February 21, 1947, Serial No. 729,981

8 Claims. (Cl. 244—102)

This invention relates to retractable landing gear for aircraft and particularly to an improved operating mechanism for raising and lowering such gear.

It is an object of the invention to provide a gear and operating mechanism therefor which is relatively light in weight and which when in retracted or raised position is very compact so that it may be contained entirely within a small pocket within the airframe.

The invention contemplates an operating mechanism having an actuating strut which contracts to raise the gear, and is so connected between the shock strut and a folding brace strut of the gear that the assembly when raised may occupy a space having a very small frontal area.

The arrangement is such that leverage of the actuator strut may be increased as the shock strut is swung from a substantially upright lowered position to a substantially horizontal raised position, which enables the use of a smaller and lighter weight actuator than would otherwise be feasible. The arrangement is also such that during gear retraction or extension both ends of the actuator move, with the end connected to the shock strut moving at a faster rate than the end connected to one link of the folding brace, and with the anomaly of the link moving in a direction opposite to the thrust of the actuator upon it.

In the preferred form of the invention the folding brace is preferably slightly beyond fully straightened or dead-center position when the gear is extended in order that it will be locked against accidental retraction by ground loads. A spring strut connected between the shock strut and the folding brace resiliently urges the latter to its substantially straightened or slightly over-center position when the gear is extended, and acts to aid folding of the brace as the gear approaches retracted position.

The shock strut is usually compressible, comprising an inner section pivoted to the aircraft and a telescoping outer or wheel-carrying part. This invention contemplates an arrangement and movements of the folding brace such that it may be employed advantageously to compress the strut as the gear retracts. In this way the strut and wheel when retracted may occupy a smaller space within the aircraft. The connection between the brace and wheel-carrying part of the shock strut comprises a single flexible cable extending along the strut.

The foregoing and other objects and advantages of the invention will become apparent from the following description of the typical embodiment thereof shown in the accompanying drawings, wherein:

Figure 1 is a rear elevational view of the gear and operating means therefor in fully extended position;

Figures 2 and 3 are similar but only fragmentary views with the gear in approximately half retracted and fully retracted positions, respectively;

Figure 4 is a bottom plan view of the structure shown in Figure 1 with the landing wheel indicated only by broken lines;

Figure 5 is a side elevational view of the upper portion of the gear with the parts in the extended position;

Figure 6 is a fragmentary front elevational view illustrating the means for compressing the shock strut upon gear retraction; and, Figure 7 is a schematic longitudinal section through the spring strut.

The landing gear assembly includes a landing wheel 11 mounted on the outer part 12 of a compressible shock strut whose inner section 13 includes a brace 14 and is pivoted by hinge means 15 to the wing, fuselage or other fixed part 16 of the aircraft structure. Pivoted at 17 to the inner shock strut section 13 and at 18 to fixed structure of the aircraft is a folding brace comprising an outer link 19 and an inner link 21. The brace is foldable about a hinge 22 at the juncture of the links to allow retraction or extension of the gear by angular movement of the shock strut about pivot 15. The hinged juncture of links 19, 21 is such that in full extended position of the gear, as shown in Figure 1, the folding brace is substantially straight with the hinge axis at 22 only slightly below the plane common to the axes of pivots 17 and 18. The links are prevented by interengagement of their abutting end portions from swinging downwardly about their respective pivot axes 17 and 18 from the substantially straight position of the brace illustrated in Figure 1, but they may swing upwardly to fold the brace during retraction of the landing gear.

For operating the gear there is provided an actuating strut 23 pivoted at 24 to the inner shock strut section and at 25 to the brace link 21. This actuator preferably is a hydraulic jack comprising a cylinder and piston unit with operating connections to a pump or other source of fluid under pressure and suitable control valve means (not shown). It will be readily understood by those skilled in the art that by such means the actuator 23 may be expanded to lower the landing gear or contracted to raise the gear.

A spring strut 26 is pivoted at 27 to the inner shock strut section and at 28 to brace link 19. The basic structure of the spring strut is shown in Figure 7. As indicated the strut may comprise a tubular body and a plunger movable axially within the body. A compression spring 29 within and backed by the tubular body presses against the plunger to constantly urge extension of the strut 26.

In order to compress the shock strut during gear retraction the brace link 19 is provided with an arm 31 to which a flexible cable 32 is pivotally connected at 33. The cable extends along the shock strut and is pivotally connected at 34 to the outer or wheel-carrying part 12 of the strut.

In operation, starting with the fully extended position of the gear shown in Figure 1, it will be seen that the spring strut 26 will act to resiliently retain the folding brace in the substantially straight or slightly over-center position shown, wherein the brace holds the shock strut against retroactive movement irrespective of the direction of loads imposed upon it. Because pivots 24 and 25 lie along a line which is angular to a line extended between pivots 18 and 25, initial contraction of the actuator 23 will cause an upward folding movement of the links 19 and 21. Continued contraction of the actuator, beyond the condition wherein points 24, 25 and 18 are aligned, will cause the pivot axes 17 and 18 to be drawn toward each other with the result that the brace 19, 21 will be folded, and, since the pivot 18 is fixed relative to the aircraft proper, the shock strut will be swung upwardly about pivot 15 into retracted position.

During such action the assembly will pass through the position shown in Figure 2 and may finally arrive at a fully retracted position such as is shown in Figure 3, wherein it will be noted that the component parts nest with great compactness. Accordingly the gear may be retracted into a shallow pocket such as may be provided in a comparatively thin airplane wing. As retraction proceeds the shock strut will also be compressed or shortened by operation of the lever arm 31 and cable 32, moving the wheel from the full line position to the broken line position of Figure 6, so that the spanwise dimension of the pocket may be a minimum.

At the beginning of a gear retracting stroke the actuator motion is resisted by the spring 29 and the leverage of the actuator is less than in later phases of retraction. However due to the upright position of the shock strut the effective leverage of gravitational forces resisting strut movement is also small at this time. As the strut approaches a horizontal position and its center of gravity is shifted farther in a horizontal direction from pivot axis 15, there is an at least partially compensating increase of the leverage of the actuating strut since during gear retraction a progressively greater stroke of the actuator is required for a given degree of angular movement of the shock strut. Furthemore as the shock strut approaches its raised or retracted position the spring strut 26 acts in a manner opposite to that at the beginning of retraction and at this later phase aiding the actuator in effecting further retraction of the gear. Due to these compensating factors a relatively small actuating strut may be employed, this also contributing to the compactness of the assembly.

While ordinarily the actuating strut will retain the gear in fully extended or retracted position, the provision of the spring strut 26 is preferred because of its action in preventing unintentional folding of the brace 19, 21 should the strut 23 fail to do so. It is also preferred that an uplock be provided to retain the gear in fully retracted position. Since, however, the particular form of such uplock is not necessary to an understanding of the present invention, it has not been illustrated or specifically described herein.

It will be understood that while the mechanism herein shown and described represents a preferred embodiment of the invention, the principles illustrated by it may be otherwise embodied without departing from the spirit of the invention or from the scope of the appended claims.

I claim:

1. In an aircraft retractable landing gear, a strut pivoted to the aircraft, a folding brace comprising a first link pivoted to the aircraft and a second link pivoted to said strut, an actuator pivoted to said strut and to said first link, the last mentioned pivotal connection being at a point on the first link substantially between the latter's pivots to the aircraft and to the second link, the line of thrust of the actuator intersecting the line of the extended brace at said pivotal connection so that during initial contraction of the actuator from its fully extended position the thrust of the actuator upon the brace is in a direction which initiates folding of the brace from a substantially fully extended position, and the points of pivotal connection of the actuator to the strut and to the first link being so disposed that during subsequent contraction the actuator's pivot to the first link is moved in a direction opposite the direction of thrust of the actuator upon said last-mentioned pivot.

2. In an aircraft retractable landing gear, a strut pivoted to the aircraft, a folding brace comprising a first link pivoted to the aircraft and a second link pivoted to said strut, the brace being folded in the retracted position of the strut and being in a slightly over-center from straightened position in the extended position of the strut, an actuator pivoted to said strut and to said first link, the last mentioned pivotal connection being at a point on the first link substantially between the latter's pivots to the aircraft and to the second link, the line of thrust of the actuator intersecting the line of the extended brace at said pivotal connection so that during initial contraction of the actuator from its fully extended position the thrust of the actuator is in a direction which initiates folding of the brace by moving the brace through an absolutely straightened position, and the points of pivotal connection of the actuator to the strut and to the first link being so disposed that during subsequent contraction the actuator's pivot to the first link is moved in a direction opposite the direction of thrust of the actuator upon said last-mentioned pivot, whereby the contraction of the actuator is less than the movement of the actuator pivot to the strut.

3. In an aircraft retractable landing gear, a strut pivoted to the aircraft, a folding brace comprising a first link pivoted to the aircraft and a second link pivoted to said strut, the brace being folded in the retracted position of the strut and being in a slightly over-center from straightened position in the extended position of the strut, an actuator pivoted to said strut and to said first link, the last mentioned pivotal connection being at a point on the first link substantially between the latter's pivots to the aircraft and to the second link, the line of thrust of the actuator intersecting the line of the extended brace at said pivotal connection so that during initial contraction of the actuator from its fully extended position the thrust of the actuator is in a direction which initiates folding of the brace by moving the brace through an absolutely straightened position, and the points of pivotal connection of the actuator to the strut and to the first link being so disposed that during subsequent contraction the actuator's pivot to the first link is moved in a direction opposite the direction of thrust of the actuator upon said last-mentioned pivot, whereby the contraction of the actuator is less than the movement of the pivot which joins the actuator to the strut, and the kinematics of said strut, brace and actuator being such that the rate of angular movement of the strut about its pivot to the aircraft decreases relative to the rate of contraction of the actuator as the strut moves from extended position to retracted position.

4. In an aircraft retractable landing gear, a strut pivoted to the aircraft, a folding brace comprising a first link pivoted to the aircraft and a second link pivoted to said strut, an actuator pivoted to said strut and to said first link in such manner that during initial contraction of the actuator from its fully extended position the thrust of the actuator upon the brace is in a direction which initiates folding of the brace from a substantially fully extended position and during subsequent contraction the actuator's pivot to the first link is moved in a direction opposite to the direction of thrust of the actuator upon said last-mentioned pivot, and a spring unit pivoted between said strut and said second link, said spring being arranged to urge retention of the brace in said substantially extended position and as the brace approaches folded position to urge the brace to such folded position.

5. In an aircraft retractable landing gear, a shock strut carrying a landing wheel and pivoted to the aircraft, a folding brace comprising a first link pivoted to the aircraft and a second link pivoted to the shock strut at a point between its pivot to the aircraft and said wheel, the brace being folded in the retracted position of the strut and substantially straight in the extended position thereof, an actuating strut adapted for expansion or contraction to respectively retract or extend the shock strut, said actuating strut being pivoted to the shock strut and to the first link at points so aligned that its contraction when the shock strut is extended will initiate folding of the brace, and said points being so positioned that during subsequent contraction the pivot of the actuating strut to the first link is moved in a direction opposite to the direction of thrust thereupon of the actuating strut and that the rate of angular retracting movement of the shock strut as retraction proceeds decreases relative to the rate of contraction of the actuating strut.

6. In an aircraft retractable landing gear, a shock strut carrying a landing wheel at one end thereof and pivoted on a first pivot to the aircraft at the opposite end thereof, a folding brace comprising a first link joined to the aircraft by a second pivot and a second link joined by a third pivot to the shock strut, the brace being folded at the juncture of said links in the retracted position of the strut and substantially straight in the extended position thereof, an actuating strut adapted for expansion and contraction respectively to extend and contract the shock strut, said actuating strut being pivoted to the shock strut at a point closer than said third pivot to the first pivot and being pivoted to the first link at a point substantially intermediate of said second pivot and said link juncture.

7. In an aircraft retractable landing gear, a shock strut carrying a landing wheel at one end thereof and pivoted on a first pivot to the aircraft at the opposite end thereof, a folding brace comprising a first link pivoted to the aircraft on a second pivot and a second link pivoted on a third pivot to the shock strut, the brace being folded at the juncture of said links in the retracted position of the strut and substantially straight in the extended position thereof, an actuating strut adapted for expansion and contraction respectively to retract and extend the shock strut, said actuating strut being pivoted to the shock strut at a point closer than said third pivot to the first pivot and being pivoted to the first link at a point substantially intermediate of said second pivot and said link juncture, and a compressed spring strut pivoted to the shock strut at a point substantially intermediate the first and third pivots and pivoted to the second link intermediate said third pivot and said link juncture.

8. In an aircraft retractable landing gear, a compressible shock strut having a wheel-carrying part and a section having a pivotal connection to the aircraft, a folding brace comprising a first link pivoted to the aircraft and a second link having a first pivot to the first link and a second pivot to said section, the brace being folded toward said pivotal connection in the retracted position of the landing gear and being substantially straight in the extended position of the gear, means for moving the landing gear between said extended and retracted positions, said second link having an arm movable as a unit therewith and extending to the opposite side of said second pivot from said first pivot, and a flexible link extending along said shock strut and connecting said arm with said wheel carrying part for compressing the shock strut as the landing gear retracts.

WILLIAM B. WESTCOTT, JR.

REFERENCES CITED

The following references are of record in the file of this patent:

UNITED STATES PATENTS

| Number | Name | Date |
|---|---|---|
| 2,355,764 | Waseige | Aug. 15, 1944 |

FOREIGN PATENTS

| Number | Country | Date |
|---|---|---|
| 463,807 | Great Britain | Apr. 7, 1937 |
| 860,926 | France | Oct. 15, 1940 |